US010474599B1

(12) United States Patent
Mohan

(10) Patent No.: US 10,474,599 B1
(45) Date of Patent: Nov. 12, 2019

(54) STRIPED DIRECT MEMORY ACCESS CIRCUIT

(71) Applicant: Xilinx, Inc., San Jose, CA (US)

(72) Inventor: Sundararajarao Mohan, Cupertino, CA (US)

(73) Assignee: XILINX, INC., San Jose, CA (US)

( * ) Notice: Subject to any disclaimer, the term of this patent is extended or adjusted under 35 U.S.C. 154(b) by 164 days.

(21) Appl. No.: 15/421,306

(22) Filed: Jan. 31, 2017

(51) Int. Cl.
*G06F 13/28* (2006.01)
*G06F 12/1081* (2016.01)
*G06F 13/16* (2006.01)

(52) U.S. Cl.
CPC .......... *G06F 13/28* (2013.01); *G06F 12/1081* (2013.01); *G06F 13/1673* (2013.01); *G06F 2212/656* (2013.01)

(58) Field of Classification Search
None
See application file for complete search history.

(56) References Cited

U.S. PATENT DOCUMENTS

| | | | | |
|---|---|---|---|---|
| 9,208,071 | B2 * | 12/2015 | Talagala | G06F 12/0246 |
| 2007/0206663 | A1 * | 9/2007 | Grover | G01S 19/30 |
| | | | | 375/147 |
| 2008/0222317 | A1 * | 9/2008 | Go | G06F 13/28 |
| | | | | 710/22 |
| 2010/0250826 | A1 * | 9/2010 | Jeddeloh | G06F 13/1684 |
| | | | | 711/103 |
| 2015/0227479 | A1 * | 8/2015 | Kwon | G06F 13/28 |
| | | | | 710/110 |
| 2017/0083335 | A1 * | 3/2017 | Burger | G06F 9/3004 |
| 2018/0095911 | A1 * | 4/2018 | Ballapuram | G06F 13/1668 |

OTHER PUBLICATIONS

Xilinx, Inc., "LogiCORE IP AXI DMA v7.1", Vivado Design Suite, Product Guide, PG021, Apr. 2, 2014, p. 1-87, San Jose, CA USA.
Xilinx, Inc., "LogiCORE IP AX14-Stream Accelerator Adapter v2.1", Vivado Design Suite, Product Guide, PG081, Apr. 2, 2014, p. 1-51, San Jose, CA USA.

* cited by examiner

*Primary Examiner* — Henry Tsai
*Assistant Examiner* — Aurangzeb Hassan
(74) *Attorney, Agent, or Firm* — Kevin T. Cuenot

(57) ABSTRACT

An apparatus can include a read data mover circuit adapted to fetch a portion of data for each of a plurality of read channels. The read data mover circuit is adapted to output, to an accelerator circuit, a plurality of bits of data for each of the plurality of read channels concurrently as first streamed data. The apparatus can include a controller configured to control operation of the read data mover circuit. In another aspect, the apparatus can include a write data mover circuit adapted to receive second streamed data from the accelerator circuit and output the second streamed data in a different format. The controller may be configured to control operation of the write data mover circuit.

16 Claims, 3 Drawing Sheets

STRIPED DIRECT MEMORY ACCESS CIRCUIT

FIELD OF THE INVENTION

This disclosure relates to integrated circuits (ICs) and, more particularly, to direct memory access circuits for use with ICs and for implementation within ICs.

BACKGROUND

Direct memory access (DMA) refers to a technology that allows hardware subsystems to access system memory, e.g., random access memory, independently of the central processing unit or processor. In the case of a circuit such as an accelerator circuit, a DMA circuit is able to fetch data from system memory and provide the fetched data to the accelerator circuit. Typically, the DMA circuit streams the fetched data to the accelerator circuit.

A multi-channel DMA circuit is able to fetch data for multiple different channels and stream the fetched data to the accelerator circuit. In the multi-channel case, however, the DMA circuit fetches the entirety of the data for a first channel and then streams the first channel data to the accelerator circuit. Only when the entirety of the first data is fetched does the DMA circuit begin to fetch the data for the second channel. The DMA circuit then fetches the entirety of the data for the second channel and then streams the second channel data to the accelerator circuit. While the data is streamed to the accelerator, the DMA circuit implements the streaming one channel at a time.

SUMMARY

One or more embodiments are directed to an apparatus. In one aspect, an apparatus can include a read data mover circuit adapted to fetch a portion of data for each of a plurality of read channels. The read data mover circuit can be adapted to output, to an accelerator circuit, a plurality of bits of data for each of the plurality of read channels concurrently as first streamed data. The apparatus can include a write data mover circuit. The apparatus further can include a controller configured to control operation of the read data mover circuit and the write data mover circuit.

One or more embodiments are directed to an apparatus. In one aspect, an apparatus can include a read data mover circuit adapted to output, to an accelerator circuit, first streamed data and a write data mover circuit adapted to receive second streamed data from the accelerator circuit. The second streamed data includes a portion of data for each of a plurality of write channels, wherein the portions of data are sent concurrently. The apparatus can include a controller configured to control operation of the read data mover circuit and the write data mover circuit.

One or more embodiments are directed to methods of generating and/or processing streamed data. In one aspect, a method can include fetching, from a memory, a portion of data to be sent on each of a plurality of read channels of a direct memory access circuit and storing the portions of data in read buffers associated with the plurality of read channels. The portions of data can be stored in the read buffers based upon read channel. The method can include concatenating a plurality of bits of data read from each of the plurality of read buffers to generate first streamed data and sending the first streamed data to an accelerator circuit.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION OF THE DRAWINGS

Figure 1:
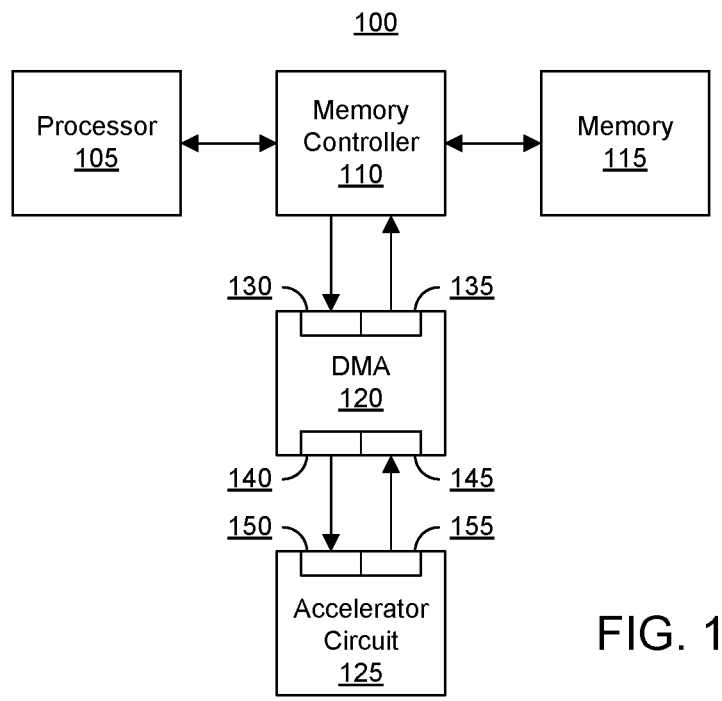
FIG. 1 illustrates an example system having a direct memory access circuit (DMA).

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to direct memory access circuits (hereafter DMAs) for use with ICs and for implementation within ICs. DMAs are often used to support data input/output for accelerator circuits. Accelerator circuits typically have wide streaming interfaces to maximize or improve data throughput. The large width of accelerator circuit interfaces means that using multiple such interfaces for an accelerator circuit is expensive in terms of IC area usage and resource utilization. Still, the wide interfaces and wide data paths allow accelerator circuits to achieve data throughput that is at least the same as or similar to other circuits that operate at higher clock frequencies with potentially more narrow data paths and/or interfaces.

Accelerator circuits typically receive multiple input data items, or arguments, read from system memory by the DMA, perform operation(s) using the multiple input data items, and generate one or more output data items that are written to the system memory by the DMA. Presently, accelerator circuits utilize one input interface that receives the multiple input data items serially, e.g., one input data item in its entirety at a time, followed by another, etc. Each input data item and each output data item corresponds to a channel of the DMA. The accelerator circuit internally buffers the input data items and tags the input data items in order to distinguish between the data that are received. This architecture not only results in increased latency in the accelerator circuit, but also requires the accelerator circuit to include sufficient memory for the buffering described.

One or more example embodiments described within this disclosure are directed to a multi-channel DMA circuit that is capable of streaming data for a plurality of channels to an accelerator circuit. The data for the plurality of channels is streamed concurrently. For purposes of discussion, the portion of data for a channel within streamed data is referred to as a "stripe." Thus, the streamed data from the multi-channel DMA circuit to the accelerator circuit includes two or more stripes. In another example, streamed data sent from the accelerator circuit to the multi-channel DMA circuit may also include multiple stripes corresponding to multiple channels or outputs.

In one example, the multi-channel DMA circuit is capable of providing each of the inputs needed by the accelerator circuit in parallel so that the accelerator circuit may begin operation with reduced latency. The multi-channel DMA circuit streams data to the accelerator so that each stripe occupies a width of the data stream that is less than the entire width of the data stream. This allows more than one stripe to be included in the data stream at one time. In another example, data streams generated by the accelerator and provided to the multi-channel DMA circuit may include more than one stripe. In one or more embodiments, the width of each stripe in a data stream, whether for an accelerator circuit input and/or for an accelerator circuit output, may be adjustable. For example, a user may set the width for each of the stripes included in a given data stream.

One or more embodiments are directed to an apparatus adapted to generate and/or receive streamed data including a plurality of stripes. An example of the apparatus is a multi-channel DMA circuit. One or more embodiments are directed to a method of generating and/or receiving streamed data including a plurality of stripes. The method may be performed by a multi-channel DMA circuit. Within this disclosure, the terms "streamed data" and "data stream" may be used interchangeably from time-to-time.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example system 100 in which one or more embodiments of the present invention may be implemented. System 100 includes a processor 105, a memory controller 110, a memory 115, a direct memory access circuit (DMA) 120, and an accelerator circuit 125.

Processor 105 may be implemented as a central processing unit (CPU) or other processor that is capable of executing computer-readable instructions. Processor 105 may include one or more cores. Memory controller 110 is capable of performing read and write transactions in memory 115. In one aspect, memory controller 110, for example, may perform read and/or write transactions in memory 115 as requested by processor 105. In another aspect, memory controller 110 may perform read and/or write transactions in memory 115 as requested by DMA 120.

Memory 115 may be implemented as any of a variety of different types of random access memory (RAM). For example, memory 115 may be implemented as a dynamic random access memory (DRAM), or the like. DMA 120 is implemented as a multi-channel DMA. DMA 120 is capable of initiating read transactions from memory 115 and/or write transactions to memory 115 through memory controller 110. DMA 120 is further configured to communicate with accelerator circuit 125 using a streaming interface, or interfaces, as the case may be.

As pictured, DMA 120 includes a read interface 130 and a write interface 135. Read interface 130 and write interface 135 are adapted for communication with memory controller 110. In one example, read interface 130 and write interface 135 are implemented as memory mapped interfaces. DMA 120 further includes a read interface 140 and a write interface 145. Read interface 140 and write interface 145 are adapted for communication with accelerator circuit 125. In one example, read interface 140 and write interface 145 are implemented as streaming interfaces.

Read interface 140 is capable of generating and outputting streamed data to accelerator circuit 125 where the streamed data includes more than one stripe. As discussed, a "stripe" refers to a portion of a data stream dedicated to convey data for one channel of the DMA. Thus, a one-to-one relationship exists between channels of the DMA and stripes within the data stream. In general, a stripe may be defined by an offset into the width of the streamed data and a number of bits indicating the width of the stripe itself. In one or more embodiments, each read channel of the DMA is used to provide one input data item to accelerator circuit 125. In this regard, a stripe also corresponds to data items, whether input or output data items, within the streamed data.

Write interface 145 is capable of receiving streamed data from accelerator circuit 125. The streamed data received from accelerator circuit 125 includes one or more stripes. Each stripe within streamed data received from accelerator circuit 125 may correspond to a write channel of DMA 120 and, for example, an output data item sent from accelerator circuit 125.

Accelerator circuit 125 is capable of performing one or more operations using two or more input data items read from memory 115 using DMA 120 (and, e.g., memory controller 110) and generating one or more output data items that are stored in memory 115 via DMA 120 (and, e.g., memory controller 110). Accelerator circuit 125 includes a read interface 150 and a write interface 155. In one example, read interface 150 and write interface 155 are implemented as streaming interfaces. Read interface 150 is capable of receiving streamed data that includes one or more stripes from read interface 140 of DMA 120. Write interface 155 is capable of generating and outputting streamed data that includes one or more stripes to write interface 145 of DMA 120.

For purposes of discussion, the term "read," as applied to an interface, refers to the point of view of reading data from memory 115. Thus, read interfaces 130, 140, and 150 are used in reading data from memory 115 and providing such data to accelerator circuit 125. Similarly, the term "write," as applied to an interface, refers to the point of view of writing to memory 115. Thus, write interfaces 135, 145, and 155 are used in writing data generated by accelerator circuit 125 to memory 115.

In one or more embodiments, DMA 120 is implemented as a hardwired circuit, e.g., using fixed circuitry. In one or more other embodiments, DMA 120 is implemented using programmable circuitry. For example, DMA 120 may be implemented within an IC that includes programmable circuitry, e.g., field programmable gate array (FPGA) circuitry, etc., by loading configuration data such as a configuration bitstream into memory cells of the IC thereby forming and physically implementing DMA 120 within the programmable circuitry of the IC. Processor 105, memory controller 110, and accelerator circuit 125 may be implemented as hardwired circuits, implemented in programmable circuitry, or any combination thereof. Memory 115 may be implemented on a separate IC or chip than processor 105, memory controller 110, DMA 120, and/or accelerator circuit 125. In some examples, memory controller 110 is also located in a different IC or chip than processor 105, DMA 120, and accelerator circuit 125.

Figure 2:
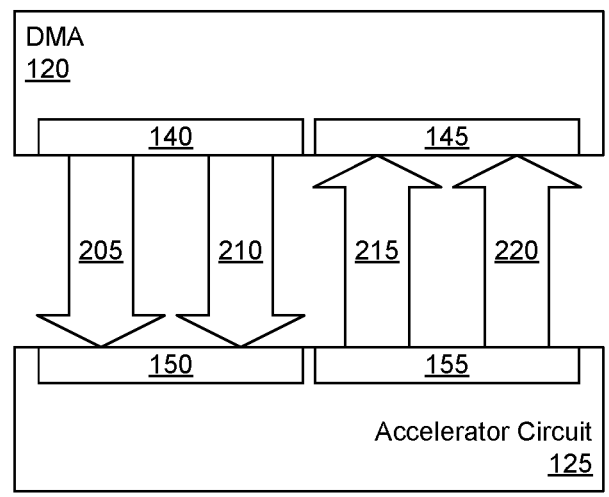
FIG. 2 illustrates an example of striped data streams between a DMA and an accelerator circuit.

FIG. 2 illustrates an example of striped data streams exchanged between DMA 120 and accelerator circuit 125 of FIG. 1. For purposes of illustration, each stripe is illustrated as an arrow. For example, FIG. 2 depicts stripes 205, 210, 215, and 220.

As noted, read interface 140 and write interface 145 are typically wide in terms of bit width. For example, read interface 140 and write interface 145 each may be 256 bits in width, 512 bits in width, etc. The wide interfaces of DMA 120 are typically a result of using wide data paths in accelerator circuit 125. The wide data paths allow accelerator circuit 125, which is typically formed of circuitry operating at clock rates in the range of approximately 150-300 MHz, to process data received via other technologies having higher clock rates such as PCIe Gen 3.0 3×16, PCIe Gen 3.0 4×8, 40 Gb Ethernet, etc. As such, read interface 140 is wider than read interface 130 since read interface 130 operates at a faster clock rate than read interface 140. Similarly, write interface 145 is wider than write interface 135 since write interface 135 operates at a faster clock frequency than write interface 145.

In general, the width of read interface 140 is the same as, or matches, the width of read interface 150, though this need not be the case. For purposes of illustration, consider an example where read interface 140 is 512 bits in width and generates streamed data output to read interface 150 in accelerator circuit 125 that is 512 bits in width. The 512-bit width is subdivided into two or more stripes. As noted, each stripe represents one read channel of DMA 120 and one input data item for accelerator circuit 125. Similarly, the width of write interface 145 is the same as, or matches, the width of write interface 155.

Thus, in the example of FIG. 2, the 512-bit width streamed data includes stripe 205 corresponding to a first channel and stripe 210 corresponding to a second and different channel. Each of stripes 205 and 210 is assigned a location within the streamed data and is allocated a particular number of bits in width. For purposes of discussion, each stripe represents or utilizes a plurality of pins of the interface(s) and connecting wires used to transmit a particular number of bits having a defined width for a channel.

As noted, accelerator circuit 125 may operate on one or more different inputs and generate one or more different outputs. For purposes of illustration, accelerator circuit 125 may compute a function of input data items to generate one or more output data items represented as f(in1, in2, . . . , inN, out1, out2, . . . , outM), where (N,M) are typically small values such as (2,1). The inputs and/or outputs of accelerator circuit 125 (e.g., in1, in2, . . . , out1, out2, . . . ) may be 8, 16, 32, or 64 bits wide. The widths of the inputs and outputs usually correspond to standard data types used by processors, e.g., processor 105 of FIG. 1.

For purposes of illustration, consider an example where an accelerator circuit is used to calculate the product of two arrays where each array has 1024 elements. Thus, each input data item is an array. A conventional DMA provides data to the accelerator circuit by reading a small number of values such as 1, 32, 256, etc. for one array at a time and sending the arrays to the accelerator circuit one at a time. As an illustrative example, the DMA may transfer 1024×4 bytes for in1, then transfer 1024×4 bytes for in2. The accelerator circuit receives the entirety of in1 and may not begin calculating out1 until the start of receiving in2.

For example, if the DMA has a bit width of 128 bits (16 bytes) to the memory controller, the DMA must fetch in1 and then fetch in2 which requires (1024×4)/16=256 clock cycles. The DMA may generate a data stream that is 512 bits (64 bytes) wide to the accelerator circuit. Thus, the DMA may transfer the received data to the accelerator circuit in another (1024×4)/64=64 clock cycles. The DMA transfers the entirety of in1 to the accelerator circuit using the 512-bit streaming interface followed by the entirety of in2 to the accelerator circuit using the 512-bit streaming interface. In consequence, the accelerator circuit must wait 64 clock cycles for the transfer of in1 to occur. The earliest the accelerator circuit may begin calculating out1 is in 64+1 clock cycles at the start of receiving in2.

Referring to the examples of FIGS. 1 and 2, DMA 120 is configured to stripe inputs in1 and in2 equally. For example, rather than read in the entirety of in1 from memory 115 and then the entirety of in2 from memory 115, DMA 120 is capable of reading portions of in1 and in2 in a comingled manner. For example, DMA 120 may read 256 bits of in1 from memory 115 (e.g., the first 8 elements of 32 bits each) followed by 256 bits of in2 from memory 115 (e.g., the first 8 elements of 32 bits each). DMA 120 may send out 512 bits of streaming data as 256 bits of in1 concurrently with 256 bits of in2. DMA 120, for example, may send streaming data formed of in1[8].in2[8] where the "." represents concatenation and "[8]" indicates that the portion of in1 and in2 in this example each includes 8 values of the array.

In the example of FIGS. 1 and 2, accelerator circuit 125 is capable of starting to produce out1 right way, e.g., upon receiving the first 256 bits of in1 and the first 256 bits of in2. In consequence, accelerator circuit 125 has a latency that is reduced from 65 clock cycles to 1 clock cycle while achieving the same data throughput.

In some cases, small burst reads from memory 115 may reduce throughput for memory accesses. For efficiency of access to memory 115, DMA 120 may be configured to request a larger burst from memory 115 (e.g., depending upon the implementation of memory controller 110). As an illustrative example, DMA 120 may request 64 values of in1 (of 32 bits each), then request 64 values of in2 (of 32 bits each). DMA 120 is capable of starting to send in1[8].in2[8] as soon as the first 8 values of in2 are available. This example results in a latency of 17 clock cycles but increases the data throughput.

Accordingly, the examples described in connection with FIGS. 1 and 2 provide benefits such as reduced latency and increased throughput over conventional DMA configurations. These benefits are not attainable by using two DMAs with multiplexed access to memory. If, for example, two DMAs are used to provide data for more than one channel concurrently, the accelerator circuit would need to be split into two different buses thereby forcing a change in the accelerator interface. In addition, using two DMAs means there is no guarantee that the second DMA will gain access to memory as soon as the first DMA finishes a single burst access. If the second DMA has to wait for access to memory, latency is increased.

Other solutions attempt to use a separate circuit block to buffer data obtained using the two DMAs and provide a wide stream of data to the accelerator circuit. In using the separate circuit block, the two DMAs still are not guaranteed to share memory access bursts in an optimal manner because the two DMAs do not communicate with one another.

Referring again to FIG. 2, accelerator circuit 125 is also capable of concatenating outputs in the case where accelerator circuit 125 generates more than one output. For example, accelerator circuit 125 is capable of generating a streamed output from write interface 155 including out1.out2 corresponding to stripes 215 and 220. Interface 155 outputs the streamed data to write interface 145 of DMA 120.

For purposes of illustration, the stripes of the data stream provided to accelerator circuit 125 and provided from accelerator circuit 125 were equal in width. In one or more other embodiments, the width of the stripes in a data stream may differ. The width of each stripe in a data stream may be specified independently of each other stripe. Further, the number of stripes in a data stream may be more than two.

Figure 3:
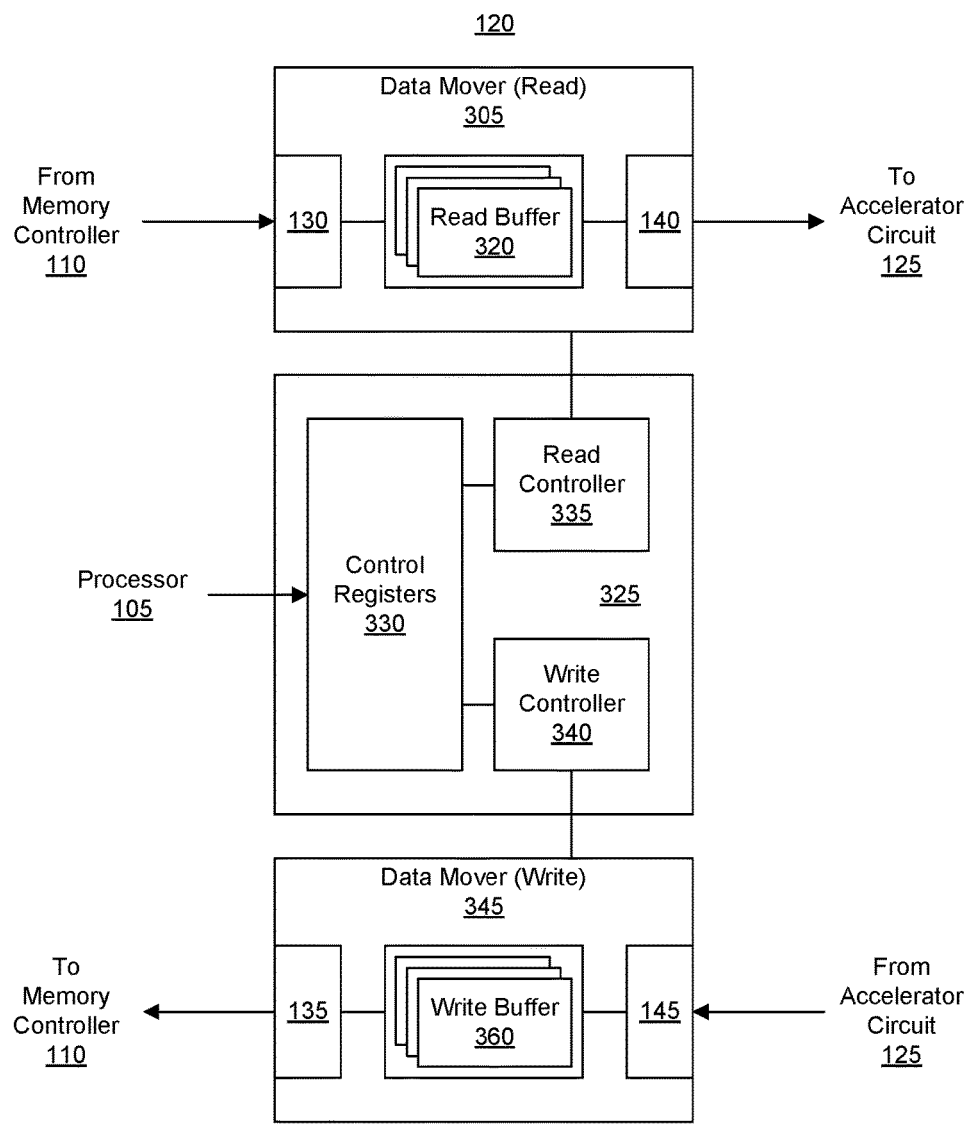
FIG. 3 illustrates an example implementation of a DMA.

FIG. 3 illustrates an example implementation of DMA 120. In the example of FIG. 3, DMA 120 includes a data mover 305, a controller 325, and a data mover 345. Data mover 305 may be referred to herein as a "read data mover." Data mover 345 may be referred to herein as a "write data mover."

Data mover 305 includes a read interface 130 that couples to memory controller 110. Read interface 130 may be implemented as a memory mapped interface. Data mover 305 also includes a read interface 140 that couples to accelerator circuit 125. Read interface 140 may be implemented as a streaming interface. Data mover 305 includes a plurality of read buffers 320. In one embodiment, data mover 305 includes one read buffer for each channel of DMA 120 or input data item that is to be concatenated and streamed concurrently from DMA 120 to accelerator circuit 125. For example, if data mover 305 is adapted to concatenate three channels, e.g., three input data items, to accelerator circuit 125, data mover 305 includes three read buffers 320.

Data mover 345 includes a write interface 135 that couples to memory controller 110. Write interface 135 may be implemented as a memory mapped interface. Data mover 345 also includes a write interface 145 that couples to accelerator circuit 125. Write interface 145 may be implemented as a streaming interface. Data mover 345 includes a plurality of write buffers 360. In one embodiment, data mover 345 includes one write buffer for each output data item or channel that is to be concatenated and streamed concurrently from accelerator circuit 125 to DMA 120. For example, if data mover 345 is adapted to receive three concatenated channels, e.g., three output data items, from accelerator circuit 125, data mover 345 includes three write buffers 360.

Controller 325 includes a plurality of control registers 330, a read controller 335, and a write controller 340. In one embodiment, control registers 330 store configuration data for each channel, e.g., each read channel and each write channel of DMA 120. Example parameters are listed below. In one or more embodiments, control registers 330 may include a control register to store each parameter for each channel. For example, control registers 330 may store, on a per channel basis, the following parameters:

Required number of bytes to be transferred. The required number of bytes to be transferred indicates the total number of bytes for an input data item or an output data item as the case may be.

Optionally a scatter-gather list.

Smallest data transfer size. The smallest data transfer size indicates the smallest amount of data that may be fetched or written by the DMA for optimal transfer performance based upon the memory controller implementation. For example, the smallest data transfer size may be a single burst or a small number of back-to-back bursts. The smallest data transfer size is less than required number of bytes to be transferred, e.g., representing the total data transfer size for an input and/or output data item. Thus, controller 325 is able to split data transfers into multiple chunks or portions to allow multiple channels to share the memory access channel in a more optimized manner.

Bus width. The bus width specifies the bit width of the stripe within the streamed data.

Offset. The offset specifies the bit offset of the stripe for the channel within the streamed data.

Group identifier. The group identifier, for example, specifies each of the other channels that are striped with the subject channel. For purposes of illustration, if the maximum number of channels of DMA 120 is 8 and two stripe groups are allowed, each stripe group can be represented by an 8-bit value that indicates each of the channels (e.g., as a 1 bit) in that group.

As pictured, processor 105 is capable of writing to control registers 330. In one embodiment, processor 105 is capable of modifying the parameters stored in control registers 330 during operation of DMA 120 so as to reconfigure DMA 120. Thus, processor 105 is capable of changing the number of channels to be concatenated in streamed data and/or which channels are to be concatenated to form streamed data, changing the bus width of the stripes, changing the smallest data transfer size, changing the required number of bytes to be transferred, etc. dynamically during operation of DMA 120.

Read controller 335 is adapted to operate based upon the particular parameters stored in control registers 330. For example, read controller 335 is capable of controlling data mover 305 to request data from the memory through memory controller 110, controlling buffering of data received from memory controller 110, and controlling concatenation of data and the output of data as streamed data to accelerator circuit 125.

For example, data mover 305 is capable of operating under control of read controller 335. Read controller 335 may control operation of data mover 305 so that, for each stripe group and for each channel in a stripe group, data mover 305, through read interface 130, fetches data sized based on the smallest data transfer size from memory and stores that data in the particular one of read buffers 320 that is allocated to the channel in the stripe group. Read controller 335 controls data mover 305 to read data from memory where data is received via read interface 130 arranged serially on a per channel basis. That is, a portion of data for a first channel is received, followed by a portion of data for a second channel, etc.

In response to fetching and storing the smallest data transfer size from memory for each channel in a stripe group in a read buffer 320, read controller 335 reshapes the data stored in read buffers 320 into a data stream that is sent to accelerator circuit 125 through read interface 140. Read controller 335 reshapes, or formats, the data into the data stream based upon the bus width and offset parameters for each of the channels in the stripe group as read from control registers 330. In one aspect, data mover 305, under control of read controller 335, sends the streamed data tagged, or including a tag, specifying the stripe group identifier. The stripe group identifier may be used by accelerator circuit 125 to decode the stripes within the received streamed data.

In one example, read controller 335 is capable of receiving data from memory controller 110 through read interface 130. Read controller 335 is capable of storing the received data within the appropriate ones of read buffers 320 based upon the channel of the received data. Read controller 335 further is capable of reading data from read buffers 320, based upon parameters stored in control registers 330, to generate streamed data that is output to accelerator circuit 125 through read interface 140.

Write controller 340 is adapted to operate based upon the particular parameters stored in control registers 330. For example, data mover 345 receives streamed data from accelerator circuit 125 via write interface 145. The streamed data received from accelerator circuit 125 is tagged, or includes a tag, specifying a stripe group identifier. Accordingly, operating under control of write controller 340, data mover 345 splits the received stream into stripes using the stripe-group identifier and parameters stored in control registers 330. Data mover 345, under control of write controller 340, stores the data for each stripe of the received streamed data into the particular one of write buffers 360 for that stripe.

Operating under control of write controller 340, data mover 345 sends data from write buffers 360 to memory via memory controller 110. The amount of data sent for writing to memory from write interface 135 may be specified by the parameter for the smallest data transfer size within control registers 330. For example, data mover 345 is capable of reading an amount of data from a first one of write buffers 360 that is equal to the smallest data transfer size and sending that data to memory controller 110. Data mover 345 is capable of then reading data from a second one of write buffers 360 that is equal in size to the smallest data transfer size and sending that data to memory controller 110, etc.

Write controller 340 controls data mover 345 to output data as described where data is sent from write interface 135 with data arranged serially on a per channel basis. That is, a portion of data for a first channel is sent, followed by a portion of data for a second channel, etc. In effect, data mover 345 reshapes the data in an opposite manner as is performed by data mover 305.

In one example, write controller 340 is capable of reading streamed data received via write interface 145 from accelerator circuit 125. Write controller 340 is capable of storing the data within the appropriate ones of write buffers 360 based upon the channels that are concatenated. As noted, write controller 340 is capable of reading the stripe group identifier from the streamed data in order to determine which bits/stripes of data are to be stored in particular ones of write buffers 360. Write controller 340 is further capable of reading data from write buffers 360, based upon parameters stored in control registers 330, to output data through write interface 135 to memory controller 110 for storing in the memory.

It should be appreciated that DMA 120 is aware of how many channels are used for purposes of reading (inputting data to the accelerator) and writing (outputting data from the accelerator) from control registers 330. DMA 120 is further aware of the number of bytes needed to be transferred for each channel from control register 330. Thus, while the examples provided herein use equivalent widths for in1 and in2, this need not be the case as noted. The offset and width parameters stored in control registers 330 for each channel allow variability. Further, the number of channels that may be concatenated together into a stripe group may be more than two. In addition, the number of channels included in a stripe group may be fewer than the total number of channels available.

As illustrated, DMA 120 is capable of fetching less than the entirety of data for a given channel, e.g., less than the entirety of in1 and/or in2, concatenating the data for multiple channels, and sending the concatenated data as a data stream. It should be appreciated that the amount of data that is fetched for in1 from memory by DMA 120 may be different than the amount of data sent within a stripe. For example, DMA 120 may fetch the first 8 elements of an array for in1, where each element is 32 bits, from memory. DMA 120 may include fewer than 8 elements in the stripe. That is, the stripe for in1 within the streamed data may have a width of 1, 2, 3, 4, 5, 6, 7, or 8 elements.

Further, DMA 120 is capable of operating in the reverse where a data stream of data for two or more channels is received in concatenated form, separated out, and written to memory. The reverse may hold true in the write direction where the amount of data provided from DMA for storage in the memory is larger than the width of the stripe for the output within the streamed data. For example, DMA 120 may receive streamed data having a stripe for out1 that is 1, 2, 3, 4, 5, 6, 7, or 8 elements in width. DMA 120 may output 8 elements or more than 8 elements of out1 at a time to the memory controller for storage in the memory.

The examples of FIGS. 1-3 achieve reduced latency in that inputs are available to accelerator circuit 125 in less time than is the case with other conventional DMAs that do not concatenate data of channels and send the data in parallel. In addition, the buffering requirements for the accelerator circuit are reduced. As discussed, in cases where the DMA does not concatenate data for multiple channels, the accelerator circuit is required to include sufficient buffers (e.g., memory) to store the entirety of in1 and at least a portion of in2. Using the various embodiments described herein, the amount of memory needed by the accelerator circuit is reduced since accelerator circuit 125 may begin operating immediately upon receiving streamed data from DMA 120 (e.g., since the streamed data includes a portion of data for each of in1 and in2).

In one or more embodiments, the interfaces may be implemented as AMBA eXtensible Interface (AXI) compliant interfaces. In one or more other embodiments, the streaming interfaces may be implemented using Xing Distributed Media Architecture (XDMA). It should be appreciated that the examples provided within this disclosure are for purposes of illustration and not limitation. As such, the interfaces may be implemented to comply with other interface architectures and/or protocols.

Figures 4, 5:
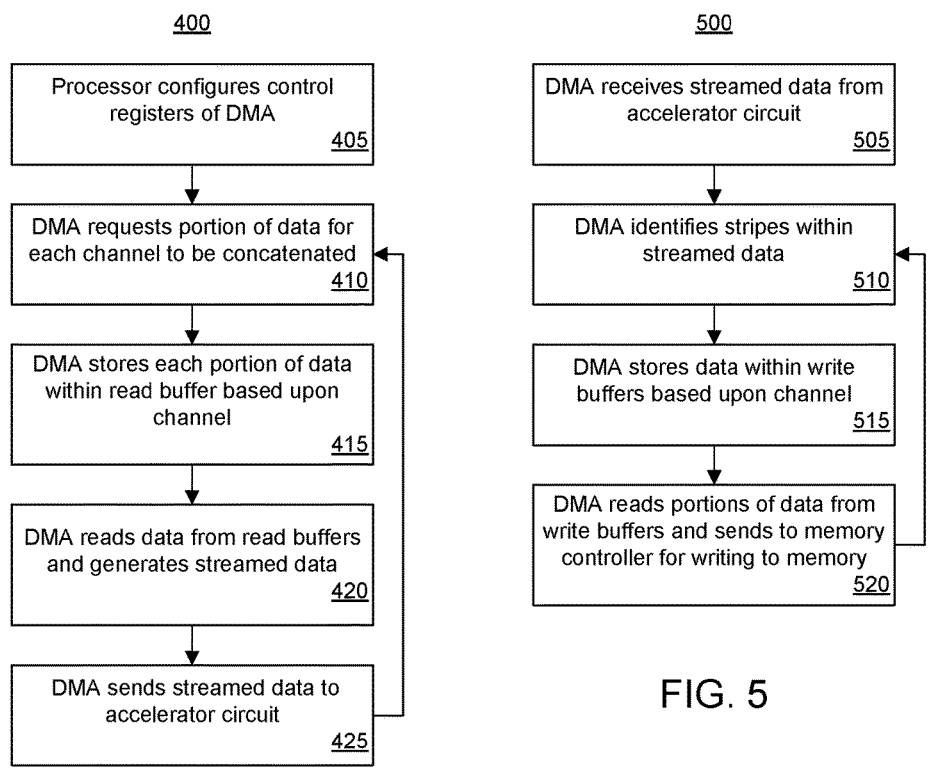
FIG. 4 illustrates an example method of operation for a DMA.
FIG. 5 illustrates another example method of operation for a DMA.

FIG. 4 illustrates an example method 400 of operation for a DMA. Method 400 illustrates an example method of operation for reading data from memory to provide the data to an accelerator circuit.

In block 405, the processor optionally configures the control registers of the DMA. For example, the processor may write values into the control registers to control concatenation for the streamed output, interpretation of streamed data from an accelerator circuit, the quantity of data that is read from memory and/or written to memory per request, or any of the other parameters described herein that may be stored in the control registers.

In block 410, the DMA requests, or fetches, a portion of data for each channel to be concatenated. For example, read controller, having read the stripe group identifier within the control register, is aware of the particular channels that are to be concatenated into streamed data and provided to the accelerator circuit. Further, the read controller is aware of the size of the portion of data to be fetched from memory for each channel from the smallest data transfer size parameter. Accordingly, the read controller fetches a portion of data sized the same as the smallest data transfer size for each of the channels of the stripe group being processed from memory.

For example, the read controller fetches a portion of data for the first channel from memory via the memory controller. The read controller then fetches a portion of data for the second channel from memory via the memory controller, etc. The portions are fetched and/or received sequentially or serially. In one embodiment, the DMA is capable of using multiple sets of descriptors to fetch and buffer the optimal burst size for each input data item. The DMA may then combine the fetched portions of data into a wide stream of data to be sent to the accelerator circuit.

In block 415, the DMA stores each portion of data within appropriate ones of the read buffers based upon channel. For example, as a portion of data for a channel is fetched and received by the DMA, the read controller stores that portion of data within the particular one of the read buffers associated with the channel. As noted, read buffers may be associated with channels (and input data items) on a one-to-one basis.

In block 420, the DMA reads data from the read buffers and generates the streamed data. For example, the read controller is configured to read an amount of data from each buffer containing data to be concatenated based upon the stripe group being processed (per the stripe group identifier). The amount of data read from each buffer by the read controller is determined based upon the width of the data to be included in the streamed data for each stripe or channel. For example, if the streamed data includes a stripe that is 32 bits wide (e.g., a specified plurality of bits) for a given channel, the read controller reads 32 bits (e.g., the number of bits) of data from the read buffer for the channel. The DMA concatenates the data as described herein. Data may be read from the read buffers using a first-in-first-out technique.

In this regard, it should be appreciated that the amount of data that is read from the read buffers and used for concatenation may differ from the amount of data that is fetched for the channel. This difference may arise, at least in part, due to optimization of memory accesses when using the memory controller. In any case, the read controller, having read data from the necessary read buffers, concatenates the data into streamed data based upon the parameters of the control registers.

In block 425, the DMA sends the streamed data to the accelerator circuit. For example, the read controller sends the concatenated, multi-channel data to the accelerator circuit. The read controller is capable tagging the streamed data to specify the stripe group identifier for the particular stripe group being processed (e.g., the stripe group to which the streamed data belongs). The stripe group identifier allows the accelerator circuit to accurately identify the different stripes of data within the streamed data to separate out the various channels (e.g., input data items) for processing. After block 425, method 400 can loop back to block 410 to continue processing.

Method 400 is provided for purposes of illustration. It should be appreciated that since method 400 illustrates operation of hardware, one or more blocks of method 400 may be performed in parallel and/or repeated. For example, the DMA may be adapted to continually fetch portions of data until the entirety of data for each channel is received. The read controller, for example, is aware of the amount of data to be fetched for each channel from the required number of bytes to be transferred control register. Accordingly, the read controller can continue fetching data in the amount specified for each channel serially until the entire amount of data for each channel is fetched. Similarly, the read controller may continue to generate streamed data and output the streamed data to the accelerator circuit until the entirety of data for each channel is provided. In this regard, certain ones of the blocks of method 400 may be performed repeatedly and/or in parallel.

In addition, while FIG. 4 does not loop back to block 405, the processor is capable of writing to control registers of the DMA as needed in order to reconfigure operation of the DMA as described herein dynamically.

FIG. 5 illustrates an example method 500 of operation for a DMA. Method 500 illustrates an example method of operation for writing data from the accelerator circuit to a memory.

In the context of method 500, the control registers of the DMA are presumed to have been written. As discussed, however, the control registers may be re-written dynamically during operation of the DMA in order to vary operation of the DMA in accordance with any of the various parameters described and stored within the control registers. Further, for purposes of illustration, the data received by the DMA from the accelerator circuit is presumed to be striped, e.g., have data for two or more channels concatenated therein. As discussed, however, this need not be the case since the DMA is capable of processing streamed data from the accelerator circuit that includes only data for one channel at a time.

In block 505, the DMA receives streamed data from the accelerator circuit. The streamed data can include a tag specifying the stripe group identifier. In block 510, the DMA identifies the stripes within the streamed data. For example, the write controller reads the stripe group identifier and, from the stripe group identifier, is aware of the channels represented within the streamed data. Further, the write controller is able to determine the bus widths and offsets for each stripe within the received streamed data from the parameters stored in the control registers.

In block 515, the DMA stores data within the write buffers based upon channel. As discussed, each write buffer may be allocated to a channel (e.g., a stripe). The allocation of write buffers to channels may be one-to-one. Accordingly, the write controller is capable of separating out the stripes for the different channels from within the streamed data received from the accelerator circuit. The write controller further is capable of storing the data for each stripe in the appropriate write buffer.

In block 520, the DMA reads the portions of data from the write buffers and sends, or outputs, the data to the memory controller for writing to the memory. For example, the write controller reads data from the buffers and sends the data to the memory controller as part of initiating a write operation to the memory. The write controller is capable of reading data from the write buffers in an amount that is equal to the smallest data transfer size parameter. The write controller is capable of reading the data in an amount equal to the smallest data transfer size (specified in the control registers) from a first write buffer and sending the data via the write interface to the memory controller. The write controller then is capable of reading data in the amount equal to the smallest data transfer size parameter from a second buffer and sending the data via the write interface to the memory controller, etc. Data may be read from the write buffers using a first-in-first-out technique. After block 520, method 500 may loop back to block 505 to continue processing.

Method 500 is provided for purposes of illustration. It should be appreciated that since method 500 illustrates operation of hardware, one or more blocks of method 500 may be performed in parallel and/or repeated. For example, the DMA may be adapted to continually receive streamed data from the accelerator circuit. The DMA may continue to store stripes of the streamed data in the appropriate write buffers as received and continually read data out of the write buffers for sending to the memory controller. The write controller is aware of the amount of data to be written for each channel from the required number of bytes to be transferred control register(s). Accordingly, the write controller can track the data being received and sent so that the write controller is aware of when the entirety of out1, out2, . . . , outN are written to memory. In this regard, certain ones of the blocks of method 500 may be performed repeatedly and in parallel.

In one or more embodiments, the method of FIG. 4 may be performed with the DMA adapted to receive streamed data from the accelerator concurrently. The streamed data from the accelerator may be striped or not. In one or more embodiments, the method of FIG. 5 may be performed with the DMA adapted to send streamed data to the accelerator concurrently. The streamed data sent to the accelerator may be striped or not.

For example, in one or more embodiments, the DMA is capable of generating streamed data to the accelerator circuit that includes a plurality of stripes and receiving streamed data from the accelerator circuit that is not striped. In one or more embodiments, the DMA is capable of generating streamed data to the accelerator circuit that is not striped and receiving streamed data from the accelerator circuit that is striped. In one or more embodiments, the DMA is capable of generating streamed data to the accelerator circuit that includes a plurality of stripes and receiving streamed data from the accelerator circuit that also includes a plurality of stripes. As discussed, the number of stripes and width of stripes in a data stream, whether for reading and/or writing, may be controlled by the control registers.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The terms first, second, etc. may be used herein to describe various elements. These elements should not be limited by these terms, as these terms are only used to distinguish one element from another unless stated otherwise or the context clearly indicates otherwise.

The flowcharts and block diagrams in the figures illustrate the architecture, functionality, and operation of possible implementations of systems and methods according to various aspects of the inventive arrangements. In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow.

The corresponding structures, materials, acts, and equivalents of all means or step plus function elements that may be found in the claims below are intended to include any structure, material, or act for performing the function in combination with other claimed elements as specifically claimed.

One or more embodiments are directed to apparatus. In one aspect, an apparatus can include a read data mover circuit adapted to fetch a portion of data for each of a plurality of read channels, wherein the read data mover circuit is adapted to output, to an accelerator circuit, a plurality of bits of data for each of the plurality of read channels concurrently as first streamed data. The apparatus can include a write data mover circuit and a controller configured to control operation of the read data mover circuit and the write data mover circuit.

In an aspect, the read data mover circuit includes a memory mapped interface adapted to receive the portions of data and a streaming interface adapted to output the first streamed data.

In another aspect, the read data mover circuit includes a plurality of read buffers corresponding to the plurality of read channels, wherein the plurality of read buffers are adapted to store the portions of data for the corresponding plurality of read channels. The controller can cause the read data mover circuit to output the first streamed data in response to receiving one portion of data for each read channel of the plurality of read channels.

In another aspect, the portions of data are portions of input data items provided to the accelerator circuit.

In another aspect, the controller includes control registers specifying minimum amounts of data to be read for the plurality of read channels and defining minimum sizes for the portions of data.

In another aspect, the controller includes control registers specifying widths and offsets for the pluralities of bits of data corresponding to the plurality of read channels within the first streamed data.

In another aspect, the write data mover circuit is adapted to receive second streamed data from the accelerator circuit and output the second streamed data in a different format.

In another aspect, the write data mover circuit includes a streaming interface adapted to receive the second streamed data and a memory mapped interface configured to output the second streamed data in the different format.

In another aspect, the second streamed data includes a portion of data for each of a plurality of write channels, wherein the portions of output data are sent concurrently. The write data mover circuit can include a plurality of write buffers corresponding to the plurality of write channels, wherein the plurality of write buffers are adapted to store the portions of data for the corresponding write channel.

In another aspect, the controller includes control registers specifying minimum amounts of data to be written to memory the plurality of write channels.

In another aspect, the controller includes control registers specifying widths and offsets for the portions of data corresponding to the plurality of write channels within the second streamed data.

In another aspect, the apparatus is a DMA circuit disposed with an IC and implemented using programmable circuitry of the IC.

One or more embodiments are directed to apparatus. In one aspect, an apparatus can include a read data mover circuit adapted to output, to an accelerator circuit, first streamed data and a write data mover circuit adapted to receive second streamed data from the accelerator circuit. The second streamed data includes a portion of data for each of a plurality of write channels, wherein the portions of data are sent concurrently. The apparatus can include a controller configured to control operation of the read data mover circuit and the write data mover circuit.

In an aspect, the write data mover circuit includes a plurality of write buffers corresponding to the plurality of write channels, wherein the plurality of write buffers are adapted to store the portions of data for the corresponding plurality of write channels.

In another aspect, the controller includes control registers specifying at least one of minimum amounts of data to be written to memory for the plurality of write channels; or, widths and offsets for the portions of data corresponding to the plurality of write channels within the second streamed data.

One or more embodiments are directed to a method of operation for a DMA circuit. In one aspect, a method can include fetching, from a memory, a portion of data to be sent on each of a plurality of read channels of a DMA circuit, storing the portions of data in read buffers associated with the plurality of read channels, wherein the portions of data are stored in the read buffers based upon read channel, concatenating a plurality of bits of data read from each of the plurality of read buffers to generate first streamed data, and sending the first streamed data to an accelerator circuit.

In an aspect, the method can include determining a number of the plurality of bits read from the read buffers based upon parameters stored within control registers.

In another aspect, the method can include determining offsets of the pluralities of bits from the read buffers within the first streamed data based upon parameters stored within control registers.

In another aspect, the method can include receiving second streamed data from the accelerator circuit, wherein the second streamed data includes a plurality of bits for each of a plurality of write channels in parallel, storing data from the second streamed data in a plurality of write buffers corresponding to the plurality of write channels, wherein the data is stored in the plurality of write buffers based upon write channel, and outputting portions of data from the plurality of write buffers sequentially.

In another aspect, the method can include performing the concatenating and the sending of the first streamed data in response to storing one portion of data for each of the plurality of read channels.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. An apparatus, comprising:
    a read data mover circuit adapted to fetch a portion of data for each of a plurality of read channels;
    wherein the read data mover circuit is adapted to output, to an accelerator circuit, a plurality of bits of data for each of the plurality of read channels concurrently as first streamed data;
    wherein the read data mover circuit comprises a plurality of read buffers corresponding to the plurality of read channels, wherein the plurality of read buffers are adapted to store the portions of data for the corresponding plurality of read channels;
    a write data mover circuit; and
    a controller configured to control operation of the read data mover circuit and the write data mover circuit;
    wherein the controller includes control registers specifying a width and an offset for each read channel of the plurality of read channels independently to convey the first streamed data and causes the read data mover circuit to output the first streamed data in response to receiving one portion of data for each read channel of the plurality of read channels.

2. The apparatus of claim 1, wherein the read data mover circuit comprises:
   a memory mapped interface adapted to receive the portions of data; and
   a streaming interface adapted to output the first streamed data.

3. The apparatus of claim 1, wherein the portions of data are portions of input data items provided to the accelerator circuit.

4. The apparatus of claim 1, wherein the control registers further specify minimum amounts of data to be read for the plurality of read channels and define minimum sizes for the portions of data.

5. The apparatus of claim 1, wherein the write data mover circuit is adapted to receive second streamed data from the accelerator circuit and output the second streamed data in a different format.

6. The apparatus of claim 5, wherein the write data mover circuit comprises:
   a streaming interface adapted to receive the second streamed data; and
   a memory mapped interface configured to output the second streamed data in the different format.

7. The apparatus of claim 5, wherein:
   the second streamed data includes a portion of data for each of a plurality of write channels, wherein the portions of data for the plurality of write channels are sent concurrently; and
   the write data mover circuit comprises a plurality of write buffers corresponding to the plurality of write channels, wherein the plurality of write buffers are adapted to store the portions of data for the corresponding plurality of write channels.

8. The apparatus of claim 7, wherein the control registers further specify minimum amounts of data to be written to memory for the plurality of write channels.

9. The apparatus of claim 7, wherein the control registers further specify widths and offsets for the portions of data corresponding to the plurality of write channels within the second streamed data.

10. The apparatus of claim 1, wherein the apparatus is a direct memory access circuit disposed with an integrated circuit and implemented using programmable circuitry of the integrated circuit.

11. An apparatus, comprising:
   a read data mover circuit adapted to output, to an accelerator circuit, first streamed data;
   a write data mover circuit adapted to receive second streamed data from the accelerator circuit;
   wherein the second streamed data includes a portion of data for each of a plurality of write channels, wherein the portions of data are sent concurrently;
   wherein the write data mover circuit comprises a plurality of write buffers corresponding to the plurality of write channels, wherein the plurality of write buffers are adapted to store the portions of data for the corresponding plurality of write channels; and
   a controller configured to control operation of the read data mover circuit and the write data mover circuit;
   wherein the controller includes control registers specifying a width and an offset for each write channel of the plurality of write channels independently to convey the second streamed data and causes the write data mover circuit to store the portions of data in the plurality of write buffers based upon write channel and output the portions of data from the plurality of write buffers sequentially.

12. The apparatus of claim 11, wherein the control registers further specify minimum amounts of data to be written to memory for the plurality of write channels.

13. A method, comprising:
   fetching, from a memory, a portion of data to be sent on each of a plurality of read channels of a direct memory access circuit;
   storing the portions of data in read buffers associated with the plurality of read channels, wherein the portions of data are stored in the read buffers based upon read channel;
   concatenating a plurality of bits of data read from each of the plurality of read buffers to generate first streamed data;
   sending the first streamed data to an accelerator circuit;
   receiving second streamed data from the accelerator circuit, wherein the second streamed data includes a plurality of bits for each of a plurality of write channels in parallel;
   storing data from the second streamed data in a plurality of write buffers corresponding to the plurality of write channels, wherein the data is stored in the plurality of write buffers based upon write channel; and
   outputting portions of data from the plurality of write buffers sequentially.

14. The method of claim 13, further comprising:
   determining a number of the plurality of bits read from the read buffers based upon parameters stored within control registers.

15. The method of claim 13, further comprising:
   determining offsets of the pluralities of bits from the read buffers within the first streamed data based upon parameters stored within control registers.

16. The method of claim 13, further comprising:
   performing the concatenating and the sending of the first streamed data in response to storing one portion of data for each of the plurality of read channels.

* * * * *